(12) United States Patent
Tatum et al.

(10) Patent No.: US 6,379,440 B1
(45) Date of Patent: *Apr. 30, 2002

(54) INK JET PRINTER DISPERSION INKS

(75) Inventors: John Philip Tatum, Isleham; Jill Woods, March; Mary Catherine Ambrose Griffin, Cambridge, all of (GB)

(73) Assignee: Xaar Technology Limited, Cambridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,502

(22) Filed: Mar. 31, 1998

(30) Foreign Application Priority Data

Oct. 23, 1995 (GB) ................................ 9521673

(51) Int. Cl.⁷ ................................ C09D 11/00
(52) U.S. Cl. .................... 106/31.13; 106/31.6
(58) Field of Search ................ 106/31.13, 31.6

(56) References Cited

U.S. PATENT DOCUMENTS

| 4,057,436 A | * | 11/1977 | Davies et al. | 106/504 |
| 4,155,767 A | * | 5/1979 | Specht et al. | 106/31.06 |
| 4,210,566 A | * | 7/1980 | Murray | 106/31.06 |
| 5,034,508 A | * | 7/1991 | Nishizaki et al. | 528/408 |
| 5,272,201 A |   | 12/1993 | Ma et al. | 524/505 |
| 5,352,729 A |   | 10/1994 | Birkhofer et al. | 524/549 |
| 5,372,747 A | * | 12/1994 | Uhrig et al. | 106/499 |
| 5,750,594 A |   | 5/1998 | Page et al. | 523/161 |

FOREIGN PATENT DOCUMENTS

| JP | 1-234479 |   | 9/1989 |
| JP | 2-105877 |   | 4/1990 |
| JP | 6-264016 |   | 9/1994 |
| JP | 6264016 | * | 9/1994 |
| JP | 9-31383 |   | 2/1997 |
| JP | 9-111174 |   | 4/1997 |
| JP | 10-204370 |   | 8/1998 |

* cited by examiner

Primary Examiner—Mark L. Bell
Assistant Examiner—Veronica F. Faison
(74) Attorney, Agent, or Firm—Marshall, Gerstein & Borun

(57) ABSTRACT

Ink jet printer dispersion inks are provided which contain a dispersant having basic or acid groups and a non-destabilizing amount of a neutralizer for said groups. The inks exhibit improved non-wetting characteristics leading to lengthening of the duration of periods of continuous printing that can be achieved before cleaning or replacement of the nozzle plate of the ink jet print head is required.

17 Claims, No Drawings

INK JET PRINTER DISPERSION INKS

This invention relates to ink jet printer dispersion inks.

In ink jet printing, a fluid ink is forced under pressure, and sometimes at elevated temperature, through a very small nozzle in a printing head. In one kind of printer, known as a "continuous" printer, ink droplets which are produced continuously are passed through a charging area where individual droplets receive an electrical charge in response to a signal and are directed towards a substrate to be printed. The droplets then pass through an electrical field causing them to be deflected by an amount which is dependent on the intensity of the charge and the field. Droplets not required to form print on the substrate are directed to a by-pass gutter. Inks for use in such printers need to be conductive.

In another kind of printer, known as a "drop-on-demand" (DOD) printer, the ink droplets are expelled from the nozzle of a print head only when required during the printing process. Drop-on-demand printers can use an electrostatically accelerated ink jet or droplet sequences ejected by pressure impulse actuation. In the latter kind of DOD printer, each drop of ink is individually ejected from a nozzle by means of pressure pulses induced e.g. by use of a piezoelectric actuator acting on the ink in the channel supplying the nozzle or by generation of a vapour bubble in response to a thermal pulse.

In general, there are two classes of ink for use in such ink-jet printers, namely solvent inks in which the colourant, usually a dye, is dissolved in a solvent, and dispersion inks wherein the colourant, i.e. pigment, is dispersed in a diluent. The present invention is concerned with the latter class.

One particular problem that is encountered with continuous printing with an ink jet printer is that a small amount of the tail of the droplet being ejected tends to separate from the droplet and collect on the surface of that part of the area of the nozzle plate immediately surrounding the nozzle. In general, provided the surface energy of the plate is sufficiently low this ink deposit will simply recede into the nozzle and be ejected as part of a later droplet; however as the frequency of droplet ejection is increased, there is less opportunity for the ink to recede before ejection of the next droplet and a pool of ink commences to form on the surface of the nozzle plate the size of which can increase until it reaches a level at which it, or airborne dust or other contaminant which is attracted to the thus-wetted nozzle plate, interferes with droplet ejection and prevents reliable operation of the printer. The problem is further exacerbated by the trend towards increasing the number of nozzles per unit area of the nozzle plate and thus reducing internozzle spacing. Moreover any residue of ink on the nozzle plate surface can be disadvantageous where different coloured inks are being used because of the risk of contaminating one colour with another. It thus becomes necessary from time to time to clean the face of the nozzle plate, e.g. by wiping. This is undesirable because it means interrupting the printing run and because repeated wiping of the nozzle plate face can damage its surface.

Improved treatment of the relevant part of the surface of the nozzle plate of the printhead to reduce its surface energy, e.g. by provision of a so-called non-wetting coating e.g. of fluorocarbon or fluorosilane, can substantially reduce the problem and increase the duration of acceptable operation before cleaning or replacement of the nozzle plate is required; however, with commercial demands for ever increasing reliability and reduced down time for servicing, still further improvement would be welcomed and therefore the applicants have addressed not only the nature of the surface of the printhead nozzle plate but also the nature of the ink.

One class of inks which has proved particularly attractive for their print quality and performance is dispersion inks. Of particular interest are those which employ an ionic dispersant, more preferably a macromolecular polyionic dispersant, to improve the stability of the disperse phase. Ionic dispersants, as the term is used herein, describes dispersants comprising molecules having acid or basic groups, and macromolecular polyionic dispersants, as the term is used herein, comprise large molecules, e.g. oligomers or polymers, sometimes of imprecisely known size or structure, carrying a large number of either acidic or basic groups, eg. in the form of repeating units having acid or basic groups in the polymeric or oligomeric structure.

Ink jet printers employing dispersion inks based on ionic dispersants can produce excellent print reliability for substantial periods; however, a still further improvement in their performance, and in particular the duration of the periods of continuous printing that can be achieved before cleaning, eg. wiping, or replacement of the nozzle plate of the ink jet print head, would be desirable.

We have now found in accordance with the present invention that such an improvement may be obtained by including in the ink a non-destabilising amount of a compound (hereinafter referred to as a neutraliser) containing at least one group capable of neutralising the acidic or basic groups, respectively, of the dispersant. Moreover, when using the ink in an ink jet printer head of a drop-on-demand printer, greater negative ink supply pressure can be withstood without ingesting air and greater short term positive pressure surges, eg. due to acceleration or deceleration of the print head on a shuttle, can be tolerated without flooding.

As the amount of dispersant included in a dispersion ink is increased from zero, we have found from earlier work that the viscosity of the ink decreases until it reaches a minimum and then commences to increase again and that the optimum amount of dispersant from the point of view of overall properties of ink is approximately that which results in the minimum viscosity or slightly in excess thereof; e.g. from 100% to 200% of that amount, and more generally from 100% to 150% of that amount. This generally equates to about 0.1 to 1, more usually about 0.1 to 0.7 part, per part of pigment, by weight. While not wishing to be bound by this theory, it is believed that at this concentration of dispersant, the acidic or basic groups provided by the dispersant are in excess of those required to stabilise the dispersion of pigment in the diluent and that the excess increases the ability of the ink to wet a surface. In any event, it has been found that adding a small proportion of a compound containing a moiety or moieties capable of neutralising the acidic or basic groups of the dispersant increases the speed with which the ink deposit left by the droplet on the surface of the nozzle plate recedes into the nozzle and thus reduces the risk of forming a pool on the surface of the nozzle plate. A direct indication of this property can be obtained by measuring the dewetting or receding meniscus velocity (RMV) of the ink on a surface.

For a discussion of dewetting velocity and its measurement, reference is made to the article by Redon et al in Physical Review Letters, Vol 66, No. 6, Feb. 11, 1991, pages 715–718.

While the invention will be illustrated by reference to non-aqueous inks it is believed that it is generally applicable to both aqueous and non-aqueous inks. Particular attention, however, has been given to inks wherein the diluent is non-aqueous or substantially non-aqueous (that is to say, it contains less than 2% water by weight), and has a low polar solubility parameter, e.g. not greater than 7.0 $MPa^{1/2}$.

References herein to polar solubility parameter are to the values obtained according to the method of Hansen, C. M. and Skaarup, K., Journal of Paint Technology, 39 No. 51, pp. 511–514 (1967) as detailed by Patton, T.C. "Paint Flow & Pigment Dispersion" 2nd Ed., Wiley Interscience, 1979. Particular examples of non-aqueous diluents with a low polar solubility parameter eg. a polar solubility parameter of 7.0 $MPa^{1/2}$ or less, are non-polar organic solvents and mixtures thereof with polar solvents, e.g. containing a minor amount by weight, preferably 5 to 40% by weight, of polar solvent or solvents. Examples of polar solvents are alcohols, esters including mixtures such as marketed under the trade name Coasol, ketones and, especially, ethers, particularly mono- and di-alkyl ethers of glycols and polyglycols, e.g. monomethyl ethers of mono-, di- and tri-propylene glycols and the mono-n-butyl ethers of ethylene, diethylene and triethylene glycols. Examples of suitable non-polar solvents are aliphatic and aromatic hydrocarbons having at least six carbon atoms and mixtures thereof including refinery distillation products and by-products.

While diluents with a low polar solubility parameter are preferred, other diluents, e.g. consisting essentially of polar constituents, may be used. The diluent, which should be single phase, preferably has the following properties:

Boiling point: at least 100° C., preferably at least 200° C.;

Viscosity: not greater than 30 mPas, preferably not greater than 15 mPas, more preferably not greater than 12 mPas measured at 30° C. using a Bohlin CS Rheometer with CP4/40 measuring system;

Freezing point: not more than 10° C., preferably not more than 7° C.;

Polar solubility parameter: up to 7 $MPa^{1/2}$, more preferably 0.1 or 0.2 to 2 $MPa^{1/2}$.

Particular examples of diluents are aliphatic hydrocarbon solvents such as those sold under the trade names Exxsol, Solvesso, Exxon naphtha, Isopar, Pegasol and Shellsol, mixtures of such solvents with alcohols, especially long chain alcohols, e.g. containing 535 wt.% alcohol, and mixtures of such solvents with alcohols, especially long chain alcohols, and ethers, e.g. containing 90 to 45% by weight of the hydrocarbon. By a long chain alcohol we mean an alcohol containing at least 10, eg. 10 to 30, carbon atoms. In general, the diluent will form from 60 to 98.5%, and preferably from 75 to 90%, by weight of the ink.

While the invention is applicable to any inks containing dispersants having acid or basic groups and capable of stabilising the dispersion of the chosen pigment in the chosen diluent, it is particularly applicable to inks containing macromolecular polyionic dispersants. It is preferred that the dispersant is soluble in the diluent or is so highly solvated that the mixture of diluent and dispersant is substantially indistinguishable from a true solution. Examples of dispersants for use in non-aqueous diluents such as organic solvents e.g. having a polar solubility parameter less than 7 $MPa^{1/2}$ are polyester amine dispersants such as those sold by Zeneca Colours under the trade name SOLSPERSE and dispersants sold under the trade name EFKA. Mixtures of dispersants may also be used.

Any suitable pigment may be used provided it will form a stable dispersion in the chosen diluent. Examples are phthalocyanines, quinacridones, Lithol Rubine 4B toners, isoindolinones, and Rhodamine G lakes (triphenyl methane derivatives). Preferred pigments are found amongst those characterised as pigment dyes in The Colour Index. Preferably the pigment will be of a primary subtractive hue. The pigment should be lightfast, and thermally stable even with repeated warming. Carbon blacks may also be used. The appropriate concentration of pigment will depend upon its nature but in general will be in the range of from 2 to 20%, preferably from 4 to 15%, by weight of the ink.

The nature of the active group of the neutraliser will depend upon whether the dispersant has acidic groups or basic groups. For example, where the dispersant is a polyamine, the neutraliser is suitably an acid. Any suitable acid may be employed as a neutraliser provided it is compatible with the ink and preferably soluble in the diluent; examples are Lewis acids, inorganic acids, organic acids and phenols. The neutraliser may also be a small molecule or a polymer. Examples are organic carboxylic acids such as acetic, citric, tartaric, toluic and β-naphthoic; organic sulphonic acids such as 2-naphthalene sulphonic and p-toluene sulphonic; simple phenols, e.g. resorcinol and 2-naphthol; alkyl phenols e.g. nonyl phenol; alkyl partial esters of acids of phosphorus, e.g. phosphoric acid and phosphinic acid; and polymeric compounds containing phenolic groups, for example novolaks, e.g. having the repeating units containing the following structure:

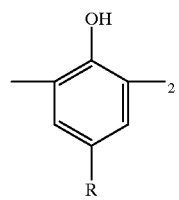

where R is an alkyl group e.g. as in butyl or octyl, e.g. Uravar FN5.

Where the dispersant contains acidic groups, the neutraliser may suitably be an amine.

The most suitable neutraliser for a given ink and the amount required, which will depend on its nature and its equivalent weight, can best be determined by simple experiment, e.g. by plotting concentration against the value obtained for the RMV of the resultant ink. In general, even a small amount of neutraliser will provide an improvement and increasing the amount increases the RMV up to a maximum after which further increases in the amount of neutraliser employed may result in a reduction in the RMV. However, an amount, which will vary with the nature of the compound employed, will eventually be reached at which the ink will be destabilized; that is to say, sedimentation and/or an increase in viscosity is detected in the ink within 28 days of standing at 25° C. This amount is generally about equal to that which yields the maximum value for RMV and thus the preferred amount of neutraliser is generally in the range of about 25 to 100%, more preferably 50 to 95%, of that which yields the maximum RMV value.

The dispersion inks according to the invention may be made by a method including the steps of (a) forming a stable dispersion comprising colourant, a dispersant having basic or acidic groups, and a diluent; and thereafter (b) adding a non-destabilising amount of neutraliser.

The invention is now illustrated by the following Examples in which all parts are expressed as parts by weight except where otherwise indicated.

EXAMPLE 1 (Comparative)

An ink jet ink was prepared having the following composition:

| | | |
|---|---|---|
| Diluent | Exxsol D140 | 57.3 parts |
| | Novol | 17.75 parts |
| | Dowanol TPM | 10 parts |
| Pigment | Regal Black 250R | 11.0 parts |
| Dispersant | Solsperse 13940 | 3.75 parts |
| | Solsperse 5000 | 0.2 part. |

Exxsol D140 is a mixture of aliphatic hydrocarbons having a boiling range of 280° C. to 317° C. marketed by Exxon.

Novol is a substantially pure oleyl alcohol marketed by Croda.

Dowanol TPM is tripropyleneglycol monomethyl ether marketed by Dow.

Regal Black 250R is a carbon black marketed by Cabot Corporation.

Solsperse 13940 is a polyester amine hyperdispersant marketed by Zeneca Colours and contains 40% by weight of active ingredient.

Solsperse 5000 is a substituted ammonium phthalocyanine marketed by Zeneca Colours.

Exxsol, Novol, Dowanol, Regal Black and Solsperse are all trade marks.

The resultant ink composition was a stable ink having a viscosity of approximately 10 mPas and gave high definition print of good optical density on plain paper when printed from a multi-nozzle drop-on-demand printer operating at multi-line and high speed. By "stable" is meant that the ink did not precipitate or coagulate after 3 months at 65° C., preferably 70° C.

The receding meniscus velocity (RMV) of the ink was measured in the following manner. A soft foam pad which has been soaked in the ink is drawn across a non-wetting fluorosilane surface at a measured velocity. The velocity at which the ink just fails to follow the foam pad and begins to leave a trail upon the non-wetting coating is taken to be the RMV. The non-wetting fluorosilane surface employed in the test was derived from a one-step fluorosilane coating composition comprising methyl triethoxy silane, 3-aminopropyl triethoxy silane and 1H,1H,2H,2H-perfluorooctyl triethoxysilane and obtained by mixing together 30 parts ethanol, 0.9 part glacial acetic acid, 2.0 parts hexanol and 5 parts hydrochloric acid (0.01 mol/dm$^3$) and then adding 5 parts methyl triethoxysilane, 0.5 part 3-aminopropyl triethoxysilane and 0.5 part 1H,1H,2H,2H perfluorooctyl triethoxysilane to the mixture. The solution so formed was then allowed to age for 2 days to allow hydrolysis of the silicon compounds. A sheet of Upilex-R polyimide was washed with about 1 mol/dm$^3$ NaOH, rinsed well with water and dried by wiping with a clean room wipe and the aged solution was applied to the surface of the sheet using a meter bar to form a wet coating approximately 4 microns thick. The coated sheet was allowed to stand for 5 minutes and then placed in a humid atmosphere in an oven at 95° C. for 3 hours. The resulting fluorosilane coating thickness was of the order of 0.6 microns.

(Upilex-R is available from the Ube Chemical Company of Japan. Upilex is a trade mark). The measured RMV was about 1.6 mm.sec$^{-1}$.

EXAMPLES 2–29

A number of ink jet ink formulations were prepared having the same formulation as in Example 1 but wherein some of the Exxsol D140 was replaced by an equal amount, by weight, of a neutraliser for the dispersant. The nature and amount of the neutraliser employed and the RMV of the resultant ink composition, measured as described in Example 1, are recorded in Table 1.

These inks had similar properties to that of Example 1 and gave print of similar quality; however, they have higher RMV values and longer uninterrupted printing times are obtained while maintaining a clean nozzle plate. Moreover, when the inks are used in ink jet printer heads of drop-on-demand printers, greater negative ink supply pressures can be tolerated than in the case of the ink of Example 1 without ingestion of air and also greater short term positive pressure surges can be withstood without flooding.

TABLE 1

| Example No. | Neutraliser | Amount Used (Parts by Weight) | RMV (mm/s) |
|---|---|---|---|
| 2 | 2-naphthalene sulphonic acid | 0.5 | 3.1 |
| 3 | 2-naphthalene sulphonic acid | 1 | 3.4 |
| 4 | 2-naphthalene sulphonic acid | 1.5 | 4.3 |
| 5 | 2-naphthalene sulphonic acid | 2 | 3.4 |
| 6 | 2-naphthalene sulphonic acid | 2.5 | 4.9 |
| 7 | 2-naphthalene sulphonic acid | 3 | 5.8 |
| 8 | 2-naphthalene sulphonic acid | 4 | 6.5 |
| 9 | 2-naphthalene sulphonic acid | 5 | 5.8 |
| 10 | para-toluene sulphonic acid | 0.5 | 3.1 |
| 11 | para-toluene sulphonic acid | 1 | 3.1 |
| 12 | para-toluene sulphonic acid | 1.5 | 3.7 |
| 13 | para-toluene sulphonic acid | 2 | 4.9 |
| 14 | para-toluene sulphonic acid | 2.5 | 4.3 |
| 15 | para-toluene sulphonic acid | 3 | 4.9 |
| 16 | para-toluene sulphonic acid | 3.5 | 5.9 |
| 17 | Acetic Acid | 0.15 | 2.1 |
| 18 | Acetic Acid | 0.3 | 2.7 |
| 19 | Acetic Acid | 0.45 | 2.5 |
| 20 | Acetic Acid | 0.6 | 3.4 |
| 21 | Acetic Acid | 0.75 | 3.7 |
| 22 | Acetic Acid | 0.9 | 4.6 |
| 23 | Acetic Acid | 1.02 | 4.6 |
| 24 | Acetic Acid | 1.2 | 3.4 |
| 25 | iso octyl phosphate | 1 | 5 |
| 26 | iso octyl phosphate | 2 | 7.5 |
| 27 | iso octyl phosphate | 3 | 7 |
| 28 | iso octyl phosphate | 4 | 6.5 |
| 29 | iso octyl phosphate | 5 | 5.9 |

EXAMPLES 30–38

A series of ink jet compositions were prepared containing, by weight

| | | |
|---|---|---|
| Diluent: | Exxsol D140 | Various amounts as specified in Table 2 |
| | Novol | 20 parts |
| Pigment: | Regal Black 250R | 11 parts |
| Dispersant: | Solsperse 13940 | 3.75 parts |
| | Solsperse 5000 | 0.2 part |
| Neutraliser: | Various as specified in Table 2 | |

TABLE 2

| Example No. | Exxsol D140 (Parts by Weight) | Neutraliser | Amount Used Parts by Weight) | RMV (mm/s) |
|---|---|---|---|---|
| 30 | 64.55 | resorcinol | 0.5 | 6.3 |
| 31 | 64.05 | resorcinol | 1 | 7.9 |
| 32 | 63.05 | resorcinol | 2 | 8.4 |
| 33 | 62.05 | resorcinol | 3 | 8.2 |

TABLE 2-continued

| Example No. | Exxsol D140 (Parts by Weight) | Neutraliser | Amount Used Parts by Weight) | RMV (mm/s) |
|---|---|---|---|---|
| 34 | 64.05 | 2-naphthol | 1 | 3 |
| 35 | 63.05 | 2-naphthol | 2 | 3.9 |
| 36 | 62.05 | 2-naphthol | 3 | 7.6 |
| 37 | 61.05 | 2-naphthol | 4 | 9.3 |
| 38 | 60.05 | 2-naphthol | 5 | 9.9 |

EXAMPLES 39 TO 46

A series of ink jet compositions were prepared containing, by weight

| Diluent: | Exxsol D140 | Various amounts as specified in Table 3 |
| | Novol | 10 parts |
| Pigment: | Regal Black 250R | 11 parts |
| Dispersant: | Solsperse 13940 | 3.75 parts |
| | Solsperse 5000 | 0.2 part |
| Neutraliser: | Various as specified in Table 3. | |

TABLE 3

| Example No. | Exxsol D140 (Parts by Weight) | Neutraliser | Amount Used Parts by Weight) | RMV (mm/s) |
|---|---|---|---|---|
| 39 | 74.8 | Uravar FN5 | 0.25 | 2.7 |
| 40 | 74.55 | Uravar FN5 | 0.5 | 3.1 |
| 41 | 74.05 | Uravar FN5 | 1 | 4.8 |
| 42 | 73.05 | Uravar FN5 | 2 | 6.4 |
| 43 | 73.05 | Nonyl phenol | 2 | 4.2 |
| 44 | 72.05 | Nonyl phenol | 3 | 4.3 |
| 45 | 70.05 | Nonyl phenol | 5 | 6.3 |
| 46 | 67.55 | Nonyl phenol | 7.5 | 5.9 |

Uravar FN5 is an alkyl substituted novolak marketed by DSM of Netherlands.

EXAMPLES 47 TO 51

In Example 47 an ink jet ink was prepared having the following composition:

| Diluent: | Dowanol TPM | 89 parts |
| Pigment: | Regal Black 250R | 6.6 parts |
| Dispersant: | EFKA 47 | 4.1 parts |
| Neutraliser: | Uravar FN5 | 0.3 parts. |

EFKA 47 is a polyamine dispersant marketed by EFKA Chemicals. EFKA is a trade mark.

The resultant ink, which was stable and gave high definition print of good optical density when on plain paper using a drop-on-demand printer, had an RMV, measured as described in Example 1, of 13.6 mm.sec$^{-1}$.

In Examples 48 to 51, the ink composition of Example 47 was modified by changing the concentration of diluent and neutraliser as indicated in Table 4 which also records the inks so obtained.

TABLE 4

| Example No. | Amount of Diluent | Amount of Neutraliser | RMV (mm/s) |
|---|---|---|---|
| 48 | 88.6 | 0.66 | 14.3 |
| 49 | 87.8 | 1.5 | 15.7 |
| 50 | 85.3 | 4 | 14.3 |
| 51 (Comparative) | 89.3 | 0 | 2.9 |

EXAMPLE 52

An ink jet ink was prepared having the following composition:

| Monastral Blue FGX (Pigment Blue 15.4) | 5% |
| Solsperse 13940 | 5% |
| Solsperse 5000 | 0.5% |
| Novol | 9% |
| Uravar FN5 | 1.2% |
| Exxsol D140 | 79.3% |

EXAMPLE 53

An ink jet ink was prepared having the following composition:

| Fanal Pink D4830 | 5% |
| Solsperse 13940 | 5% |
| Novol | 22% |
| Uravar FN5 | 1.25% |
| Exxsol D140 | 68.75% |

EXAMPLE 54

An ink jet ink was prepared having the following composition:

| Paliotol Yellow D140 | 5% |
| Solsperse 13940 | 3.75% |
| Novol | 18% |
| Uravar FN5 | 1.5% |
| Exxsol D140 | 71.75% |

EXAMPLE 55

An ink jet ink was prepared having the following composition:

| Paliotol Yellow D140 | 5 |
| Solsperse 13940 | 3.75% |
| Uravar FN5 | 1% |
| Coasol | 90.25% |

Coasol is a liquid mixture of esters marketed by Chemoxy International Ltd.

EXAMPLE 56

An ink jet ink was prepared having the following composition:

| | |
|---|---|
| Heliogen Blue TD7105 | 5% |
| Solsperse 5000 | 0.5% |
| Solsperse 13940 | 3.75% |
| Novol | 10% |
| Uravar FN5 | 1% |
| Exxsol D140 | 79.75% |

EXAMPLE 57

An ink jet ink was prepared having the following composition:

| | |
|---|---|
| Monastral Blue FGX (Pigment Blue 15.4) | 5% |
| Solsperse 13940 | 5% |
| Solsperse 5000 | 0.5% |
| Dowanol TPM | 10% |
| Novol | 15% |
| Uravar FN5 | 5% |
| Exxsol D140 | 59.5% |

The RMV's of the ink jet inks of Examples 52 to 57, measured as described in Example 1 were as follows

| Example | RMV (mm/s) |
|---|---|
| 52 | 6.2 |
| 53 | 5.0 |
| 54 | 6.2 |
| 55 | 8.3 |
| 56 | 4.6 |
| 57 | 11.3 |

All the inks of Examples 30 to 50 and 52 to 57 exhibit greater values for RMV than an ink of the same composition but wherein all the neutraliser has been replaced by a corresponding amount of diluent and also exhibit the improved properties reported for the ink of Examples 2 to 29.

We claim:

1. An ink jet printer ink comprising a dispersion of colorant in a non-aqueous or substantially non-aqueous diluent, said dispersion including a dispersant having either basic or acid groups and a non-destablising and receding meniscus velocity (RMV) - improving amount of a neutraliser for said groups.

2. An ink as claimed in claim 1 wherein the dispersant is present in an amount of from 100% to 200% of the amount which yields an ink with minimum viscosity, the nature and amounts of the other components of the ink being unchanged.

3. An ink as claimed in claim 1, wherein the neutraliser is present in an amount which is from 25% to 100% of the amount which yields ink with the maximum receding meniscus velocity, the nature and amounts of the other components of the ink being unchanged.

4. An ink as claimed in claim 1 wherein the dispersant is a polyamine and the neutraliser is selected from Lewis acids, inorganic acids, organic acids and phenols.

5. An ink as claimed in claim 4 wherein the neutraliser is selected from alkyl partial esters of acids of phosphorus, phenols and polymeric compounds containing phenolic groups.

6. An ink as claimed in claim 1 wherein it comprises a dispersant, a pigment and a diluent and wherein the diluent has a polar solubility parameter not greater than 7 $MPa^{1/2}$.

7. An ink as claimed in claim 6 wherein the diluent comprises a mixture of non-polar organic solvent and from 5 to 40%, by weight, of a polar organic solvent.

8. An ink as claimed in claim 1 wherein it comprises a dispersant, a pigment and a diluent and wherein the diluent has a boiling point of at least 200° C., a viscosity not greater than 15 mPas and a freezing point of not more than 7° C.

9. A method of producing an ink jet printer dispersion ink as claimed in claim 1, said method including the steps of (a) forming a stable dispersion comprising colourant, a dispersant having either basic or acidic groups, and a diluent; and thereafter (b) adding a non-destabilising and receding meniscus velocity (RMV)-improving amount of neutraliser for said groups.

10. A method as claimed in claim 9 in which the diluent is non-aqueous or substantially non-aqueous.

11. A method as claimed in claim 9 wherein the dispersant is present in an amount of from 100% to 200% of the amount which yields an ink with minimum viscosity, the nature and amounts of the other components of the ink being unchanged.

12. A method as claimed in claim 9 wherein the neutraliser is present in an amount which is from 25% to 100% of the amount which yields ink with the maximum receding meniscus velocity, the nature and amounts of the other components of the ink being unchanged.

13. A method as claimed in claim 9 wherein the dispersant is a polyamine and the neutraliser is selected from Lewis acids, inorganic acids, organic acids and phenols.

14. A method as claimed in claim 13 wherein the neutraliser is selected from alkyl partial esters of acids of phosphorus, phenols and polymeric compounds containing phenolic groups.

15. A method as claimed in claim 9 wherein said ink comprises a dispersant, a pigment and a diluent and wherein the diluent has a polar solubility parameter not greater than 7 $MPa^{1/2}$.

16. A method as claimed in claim 15 wherein the diluent comprises a mixture of non-polar organic solvent and from 5 to 40%, by weight, of a polar organic solvent.

17. A method as claimed in claim 9 wherein said ink comprises a dispersant, a pigment and a diluent and wherein the diluent has a boiling point of at least 200° C., a viscosity not greater than 15 mPas and a freezing point of not more than 7° C.

* * * * *